Patented Mar. 10, 1925.

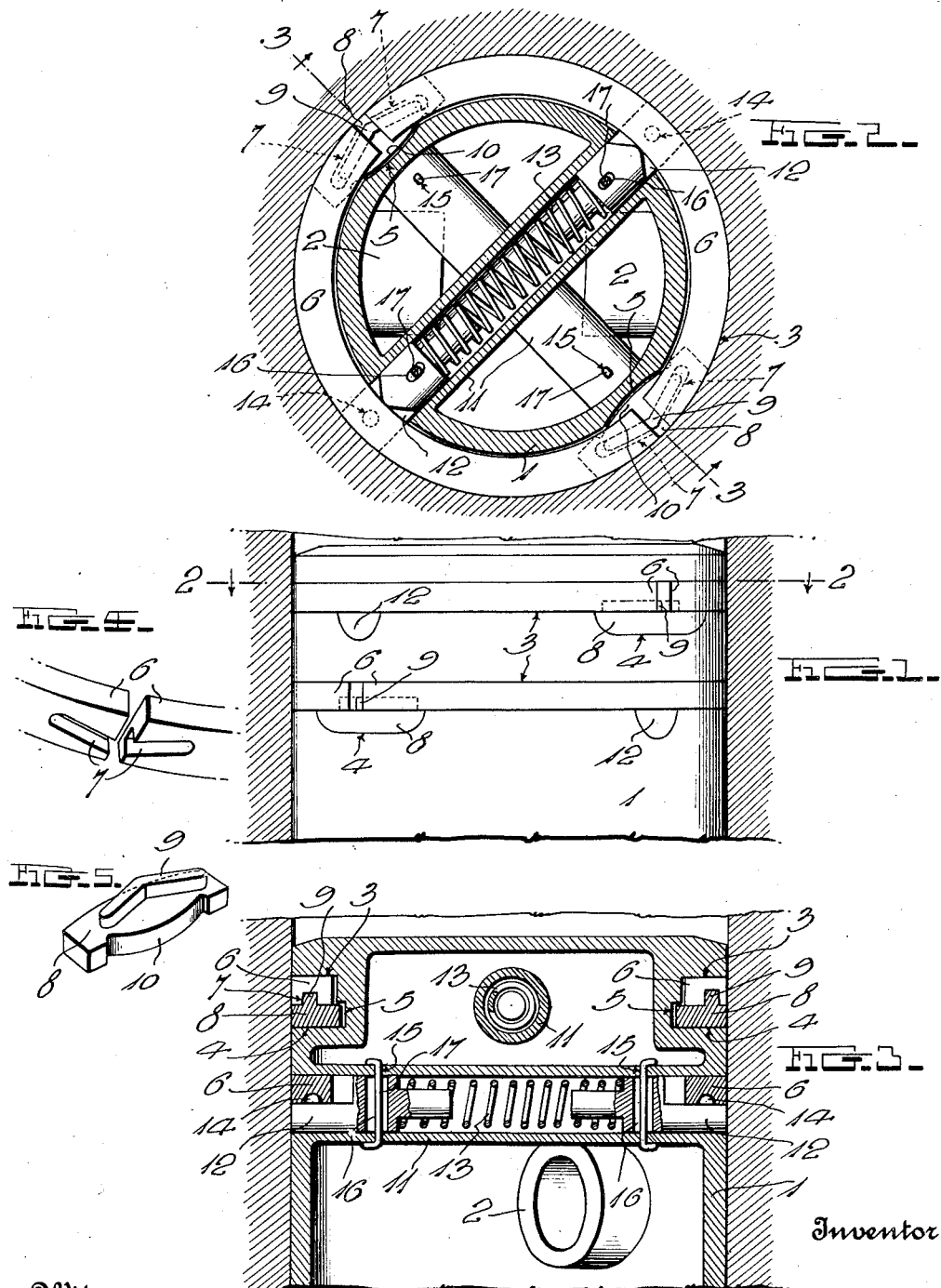

1,529,041

UNITED STATES PATENT OFFICE.

MICHAEL H. SULLIVAN, OF POUGHKEEPSIE, NEW YORK.

PISTON AND PISTON RINGS.

Application filed November 20, 1923. Serial No. 675,890.

*To all whom it may concern:*

Be it known that I, MICHAEL H. SULLIVAN, a citizen of the United States, residing at Poughkeepsie, in the county of Dutchess and State of New York, have invented certain new and useful Improvements in Pistons and Piston Rings; and I do declare the following to be a full, clear, and exact description of the invention, such as will enable others skilled in the art to which it appertains to make and use the same.

This invention relates to pistons and piston rings and constitutes an improvement over the subject matter shown by my United States Patent No. 1427425, and over my allowed United States application, Serial No. 588,246, filed September 14, 1922.

In the devices above referred to, a pair of spring-projected piston ring sections were employed, whose ends were formed in one side with arcuate grooves receiving arcuate ribs on sealing blocks contacting with said sides, the ribs and grooves being co-operable in outwardly forcing the sealing blocks when the ring sections were forced outwardly by the spring means provided for this purpose. It has been found however, that the arcuate ribs and grooves do not force the sealing blocks outwardly as efficiently as they should, as the groove and rib walls do not contact throughout their lengths when some wear has taken place. It is therefore the principal object of the present invention to provide the ring sections with straight outwardly converging grooves and to provide the sealing blocks with widely obtuse V-shaped ribs having straight halves received in said grooves, and thus the rib and groove walls will contact throughout their lengths at all times and obtain much better results.

In the devices above referred to, spring-projected plungers mounted within internal guide means of the piston, were connected with the ring sections for outwardly projecting the latter, but the springs had a tendency to project the piston rings entirely from the grooves, as soon as the piston was removed from its cylinder. Hence, a further object of the invention is to make novel provision to prevent such occurrences.

With the foregoing in view, the invention resides in the novel subject matter herein-after described and claimed, the description being supplemented by the accompanying drawing.

Figure 1 is a side elevation of a portion of the invention within a cylinder.

Figure 2 is a horizontal sectional view on line 2—2 of Fig. 1.

Figure 3 is a vertical sectional view on line 3—3 of Fig. 2.

Figure 4 is a perspective view of the meeting ends of two of the piston ring sections.

Figure 5 is a perspective view of one of the sealing blocks.

In the drawing above briefly described, the numeral 1 designates the piston having the usual connecting rod bearings 2 and a suitable number of piston ring grooves 3. Each of these grooves has one of its side walls recessed as indicated at 4, the recesses being disposed at diametrically opposite points of each groove and being here shown as extending somewhat into the inner walls of the grooves, as indicated at 5, due to the fact that a rotary cutter is used in forming the recesses.

Piston rings are positioned in the grooves 3 and are each formed of two complementary halves 6 whose ends meet at the recesses 4 and are formed in one flat side with straight outwardly converging grooves 7. Sealing blocks 8 are disposed in the recesses 4 and contact with the ring sections 6, each of said sealing blocks being formed with an integral, widely obtuse, V-shaped rib 9 having straight halves received slidably in the straight grooves 7. The inner edges of the blocks 8 may be slightly rounded as indicated at 10, to engage the portions 5 of the recesses 4, if desired.

Extending across the interior of the piston, two tubular guides 11 have been shown, in which guides plungers 12 are mounted to be outwardly forced by coiled springs 13 also housed within the guides, said plungers having suitable connections with the piston ring sections 6. In establishing these connections, studs 14 are preferably formed on the plungers 12 for reception in shallow sockets in the ring sections, so that the latter are held against circumferential creeping and cannot move radially with respect to the plungers 12. It will be seen that as any two opposed ring sections 6 are forced outwardly by the action of the spring 13, the co-acting grooves 7 and ribs 9, serve also to outwardly force the sealing blocks 8, holding them tightly against the cylinder wall. Due to the straight halves of the ribs 9 and the straight form of the grooves 7, said ribs and grooves will contact throughout their lengths at all times, instead of only having restricted contact as previously, when arcuate ribs and grooves were employed.

I prefer to provide the guides 11 with openings 15 to aline with other openings 16 in the plungers 12, the alined openings being adapted to receive pins 17 which, while permitting necessary expansion of the piston rings for tight engagement with the cylinder walls, will not permit said rings to be entirely projected from their receiving grooves, when the piston is removed from the cylinder. Thus, a great deal of difficulty heretofore encountered is effectively overcome.

Attention may further be directed to the fact that the sealing blocks 8 and their ribs 9, may be of uniform size and angularity for rings of numerous diameters which is of great manufacturing advantage over the curved ribs previously used, requiring different curvatures for rings of different diameters. If desired, the ribs 9 may be blanked from steel, and the blocks 8 die-cast and connected with the ribs during the casting operation.

The piston rings are preferably arranged so that their joints are approximately forty-five degrees from the plane of the wrist pin. Thus, any "slap" movement of the piston cannot thrust straight in upon the sealing blocks 8 with a tendency to break the ring sections.

It will be seen from the foregoing that certain distinct improvements have been made over my prior devices and while these improvements preferably take form in the manner illustrated, it will be understood that within the scope of the invention as claimed, minor changes may be made.

I claim:

1. A piston having a ring groove and recesses opening into said groove and through the periphery of the piston, a plurality of spring-projected arcuate ring sections in said groove in end to end relation, said ring sections having their meeting ends disposed at said recesses and formed with straight outwardly converging grooves opening toward the recesses and through the end walls of said sections, sealing blocks in said recesses in contact with the grooved sides of said ring sections, and widely obtuse V-shaped ribs on said sealing blocks having straight halves received slidably in said grooves.

2. A piston equipped with a sectional ring and having transverse internal guide means formed with openings, ring-expanding spring-pressed plungers in said guide means having connection with the ring sections, said plungers having openings to aline with the aforesaid openings, and pins insertable through the alined openings to prevent projection of the ring sections from the piston when the latter is removed from its cylinder.

3. Complementary piston ring sections having meeting ends formed in one flat side with outwardly converging straight grooves, and a sealing block contacting with said flat side of the ring ends and having a widely obtuse V-shaped rib with straight halves received slidably in said grooves.

4. In a piston having wrist pin bearings and a pair of ring grooves, rings in said grooves, each comprising two semi-circular sections and sealing blocks forming joints between the ends of said sections, said joints being substantially forty-five degrees from the plane of the wrist pin bearing axis for the purpose set forth.

In testimony whereof I have hereunto affixed my signature.

MICHAEL H. SULLIVAN.